US011149173B2

(12) United States Patent
Horito et al.

(10) Patent No.: US 11,149,173 B2
(45) Date of Patent: Oct. 19, 2021

(54) ADHESIVE USING BARK

(71) Applicant: WOOD ONE CO., LTD., Hatsukaichi (JP)

(72) Inventors: Masayoshi Horito, Hatsukaichi (JP); Naoko Kurushima, Hatsukaichi (JP); Tomoyuki Matsumae, Hatsukaichi (JP); Yusho Nakamoto, Hatsukaichi (JP); Yoshikazu Yazaki, Moorabbin (AU)

(73) Assignee: WOOD ONE CO., LTD., Hatsukaichi (JP)

( * ) Notice: Subject to any disclaimer, the term of this patent is extended or adjusted under 35 U.S.C. 154(b) by 0 days.

(21) Appl. No.: 15/769,882

(22) PCT Filed: Oct. 21, 2016

(86) PCT No.: PCT/JP2016/081357
§ 371 (c)(1),
(2) Date: Apr. 20, 2018

(87) PCT Pub. No.: WO2017/069271
PCT Pub. Date: Apr. 27, 2017

(65) Prior Publication Data
US 2018/0312735 A1 Nov. 1, 2018

(30) Foreign Application Priority Data
Oct. 23, 2015 (JP) .............................. JP2015-209181

(51) Int. Cl.
*C09J 161/06* (2006.01)
*C09J 193/00* (2006.01)
*C09J 11/08* (2006.01)

(52) U.S. Cl.
CPC ............. *C09J 161/06* (2013.01); *C09J 11/08* (2013.01); *C09J 193/00* (2013.01)

(58) Field of Classification Search
CPC ....................................................... C09J 193/00
See application file for complete search history.

(56) References Cited

U.S. PATENT DOCUMENTS

| | | | | |
|---|---|---|---|---|
| 2,574,784 A * | 11/1951 | Heritage | ................. | C09J 161/06 156/335 |
| 3,905,921 A * | 9/1975 | Cone | ......................... | C08J 9/30 521/181 |
| 3,966,658 A * | 6/1976 | Robitschek | ............ | C09J 161/06 524/376 |
| 4,127,544 A * | 11/1978 | Allan | ....................... | C08G 8/18 156/335 |
| 4,169,077 A * | 9/1979 | Hartman | ................... | C08G 8/28 428/529 |
| 4,201,699 A * | 5/1980 | Chen | ........................ | C08G 8/24 525/480 |
| 4,311,621 A * | 1/1982 | Nishizawa | ............... | C08L 61/06 156/328 |
| 4,608,408 A * | 8/1986 | Hood | ........................ | C08G 8/24 524/15 |
| 4,824,896 A * | 4/1989 | Clarke | .................... | C09J 161/04 524/405 |
| 4,897,314 A * | 1/1990 | Clarke | ...................... | B27D 1/04 156/307.3 |
| 5,106,697 A * | 4/1992 | Whittemore | ............. | B27D 1/04 156/288 |
| 5,556,906 A * | 9/1996 | Collins | ....................... | C09J 5/04 524/463 |
| 5,866,642 A * | 2/1999 | McVay | ..................... | C08H 6/00 524/13 |
| 2003/0203998 A1* | 10/2003 | Gres | ..................... | C08G 18/542 524/72 |
| 2003/0230653 A1 | 12/2003 | Nakamoto et al. | | |
| 2006/0276570 A1 | 12/2006 | Grigsby et al. | | |
| 2011/0262760 A1* | 10/2011 | Breyer | .................... | C08L 61/04 428/535 |

FOREIGN PATENT DOCUMENTS

| | | | | | |
|---|---|---|---|---|---|
| CA | | 1136976 A | * | 12/1982 | ............... B27D 1/04 |
| JP | | 2003-41225 A | | 2/2003 | |
| JP | | 2003-261853 A | | 9/2003 | |
| JP | | 2006-70081 A | | 3/2006 | |
| JP | | 2010-1356 A | | 1/2010 | |
| JP | | 5122668 B2 | | 1/2013 | |
| WO | WO 2009/084248 A1 | | | 7/2009 | |
| WO | WO 2011/138858 A1 | | | 11/2011 | |

OTHER PUBLICATIONS

Kopf, Phenolic Resins, Encyclopedia of Polymer Science and Technology, vol. 7, 2002 (Year: 2002).*
International Search Report (PCT/ISA/210) issued in PCT/JP2016/081357, dated Nov. 29, 2016.
Written Opinion (PCT/ISA/237) issued in PCT/JP2016/081357, dated Nov. 29, 2016.
Extended European Search Report, dated Apr. 16, 2019, for European Application No. 16857584.3.

(Continued)

*Primary Examiner* — Liam J Heincer
(74) *Attorney, Agent, or Firm* — Birch, Stewart, Kolasch & Birch, LLP

(57) ABSTRACT

Provided is an adhesive using bark, which is advantageous not only in that the proportion of the bark is increased so as to effectively utilize the bark, and the proportion of the phenolic resin is reduced to lower the adhesive solids content, but also in that the composition of the adhesive is simple. An adhesive using bark, which comprises a resol type phenolic resin and a radiata pine bark powder, wherein the adhesive contains 30 to 40 parts by mass of the radiata pine bark powder, relative to 100 parts by mass of the total of the resol type phenolic resin solids and the radiata pine bark powder. Alternatively, an adhesive using bark, which comprises a resol type phenolic resin and a radiata pine bark powder, wherein the adhesive contains 20 to 50 parts by mass of the radiata pine bark powder and wheat flour, relative to 100 parts by mass of the total of the resol type phenolic resin solids, the radiata pine bark powder, and the wheat flour, and wherein the mass ratio of the radiata pine bark powder and the wheat flour is 9:1 to 5:5.

11 Claims, No Drawings

OTHER PUBLICATIONS

Frevel et al., "Production, Composition and Toxicology Studies of Enzogenol® Pinus radiata Bark Extract," Food and Chemical Toxicology, vol. 50, 2012 (Available online Sep. 12, 2012), pp. 4316-4324, XP028956304.

Ku et al., "Characterization of Proanthocyanidin in Hot Water Extract Isolated from Pinus radiata Bark," Wood Sci Technol, vol. 41, 2007 (Published online Sep. 19, 2006), pp. 235-247, XP019489054.

Li et al., "Pine Bark Extracts: Nutraceutical, Pharmacological, and Toxicological Evaluation," The Journal of Pharmacology and Experimental Therapeutics, vol. 353, Apr. 2015, pp. 9-16, XP055574936.

Yano et al., "Production of high tannin content acacia bark powder and its application for adhesives," Wood Industry, Wood Technological Association of Japan, Oct. 1, 2005, vol. 60, No. 10, p. 478-482 (with statement of relevance in English).

\* cited by examiner

ADHESIVE USING BARK

FIELD OF THE INVENTION

The present invention relates to an adhesive using bark, which contains bark as a constituent.

BACKGROUND ART

Conventionally, as an adhesive for use in producing plywood and others, for example, a phenolic resin adhesive obtained by a condensation reaction of phenol with formaldehyde is used. The phenolic resin adhesive has an excellent water resistance such that it is suitable for outdoor use, but has a high curing temperature, as compared to other adhesives, and hence is likely to cause so-called puncture, and there is a need to use a veneer having a low moisture content. The phenolic resin adhesive basically has incorporated wheat flour as a thickening agent, calcium carbonate as an extender and soda ash (sodium carbonate) or sodium bicarbonate (sodium hydrogencarbonate) as a curing agent. Further, the phenolic resin adhesive having the formulation recommended by an adhesive manufacturer is often used so that the viscosity of the adhesive becomes 2 to 3 Pa·s (20 to 25° C.), and, in such a case, the adhesive has a solids content (adhesive solids content) of about 55%.

In contrast to the above adhesive, patent document 1 has a description of an invention which relates to an adhesive composition for plywood which has a lower occurrence of the puncture phenomenon during the production of plywood even when using veneers having a high moisture content. This adhesive composition for plywood is prepared by adding an acacia bark powder, an inorganic filler and water to an aqueous solution of a resol type phenolic resin, and has a lower increase in the viscosity after being prepared.

On the other hand, patent document 2 has a description of an invention which relates to a method for producing a high tannin-content powder and a use thereof, and discloses examples of formulations of an adhesive using a bark powder of radiata pine or acacia as working Examples.

Further, patent document 3 has a description of an invention which relates to an adhesive for plywood containing at least one compound selected from the group consisting of a resol type phenolic resin, lignin, a derivative thereof, tannin, and a derivative thereof, and a plant powder, and discloses an adhesive for plywood using a bark powder as the plant powder.

Further, non-patent document 1 has a description about the studies made on the production of a high tannin-content acacia bark powder and the application thereof to an adhesive, and discloses examples of formulations of an adhesive having an acacia bark powder, PMDI, and sodium carbonate or wheat flour added to a phenolic resin.

PRIOR ART REFERENCES

Patent Documents

Patent document 1: Japanese Patent No. 5122668
Patent document 2: Japanese Patent No. 4683258
Patent document 3: Japanese Unexamined Patent Publication No. 2006-70081

Non-Patent Document

Non-patent document 1: Hiroyuki Yano, and other 8 persons, "Production of high tannin content acacia bark powder and its application for adhesives", Wood industry, Wood Technological Association of Japan, Oct. 1, 2005, Vol. 60, No. 10, p. 478-482

SUMMARY OF THE INVENTION

Problems to Be Solved By the Invention

By the way, the bark which are generated during wood processing and not subsequently used, contains tannin (condensed tannin) having high reactivity to formaldehyde at a high concentration, and tannin obtained by hot-water extraction from acacia bark or quebracho wood has been industrially utilized as a tannin adhesive. On the other hand, tannin obtained by hot-water extraction from radiata pine bark has the disadvantage in that the extractives yield of the tannin is low, in that the adhesive prepared from the tannin has too high a viscosity, and in that the adhesive obtained from the tannin cannot obtain uniform quality, and therefore has not been industrially utilized. However, when methanol is used as a solvent in the extraction of the tannin, the above-mentioned problems can be solved, and further excellent bonding level can be obtained. In this case, a problem is encountered in that the tannin production cost including the cost for recovery of methanol as an extracting solvent is very high.

In this connection, patent documents 1 to 3 and non-patent document 1 have a description of an invention which relates to an adhesive using bark, which comprises a phenolic resin and bark as constituents. However, in this adhesive, the proportion of the bark used to the adhesive is so small, the utilization of bark is unsatisfactory, and the proportion of the phenolic resin is high and thus the adhesive solids content is high.

Further, the phenolic resin and bark as well as an inorganic compound, such as calcium carbonate or sodium hydroxide, are added to the adhesive, and hence the composition of the adhesive is complicated.

With respect to the disclosed adhesive using radiata pine bark of patent document 2, in formulation example 2 shown in Table 4 in Example 2, there is a description of an adhesive having 50 parts of a commercially available phenolic resin added to 50 parts of a bark powder. The adhesive of this formulation needs paraformaldehyde, and therefore there is concern that a problem could arise in that, for example, when the adhesive is used in the production of building materials, the liberated formaldehyde causes a sick house syndrome later. In addition, the addition of paraformaldehyde has a further problem in that, for example, thickening of the resultant glue mix is so quick that it is difficult to use the glue as an adhesive.

The present invention solves the above-mentioned problems accompanying the conventional techniques, and provides an adhesive using bark, which is advantageous not only in that the proportion of the bark is increased so as to effectively utilize the bark, and the proportion of the phenolic resin is reduced to lower the adhesive solids content, but also in that the composition of the adhesive is simple.

Means for Solving the Problems

For solving the above problems, the adhesive using bark of the present invention is an adhesive using bark, which comprises a resol type phenolic resin and a radiata pine bark powder, wherein the adhesive contains 30 to 40 parts by mass of the radiata pine bark powder, relative to 100 parts by mass of the total of the resol type phenolic resin solids and the radiata pine bark powder.

Further, the adhesive using bark of the present invention is an adhesive using bark, which comprises a resol type phenolic resin and a radiata pine bark powder, wherein the adhesive contains 20 to 50 parts by mass of the radiata pine bark powder and wheat flour, relative to 100 parts by mass of the total of the resol type phenolic resin solids, the radiata pine bark powder, and the wheat flour, and wherein the mass ratio of the radiata pine bark powder and the wheat flour is 9:1 to 5:5.

In the adhesive using bark, it is preferred that the mass ratio of the radiata pine bark powder and the wheat flour is 7:3.

Effects of the Invention

The adhesive using bark of the present invention contains a resol type phenolic resin and a radiata pine bark powder, and since the bark was used as such in the adhesive without extracting tannin with a solvent from the bark, the adhesive can be provided at a low cost and the bark, which is generated during wood processing and which is a material that is not subsequently used for other purposes, can be effectively utilized. Further, the composition of the adhesive is simple.

When the adhesive contains 30 to 40 parts by mass of the radiata pine bark powder, relative to 100 parts by mass of the total of the resol type phenolic resin solids and the radiata pine bark powder, the proportion of the bark can be increased so as to effectively utilize the bark, and the proportion of the phenolic resin can be reduced to lower the adhesive solids content.

Further, when the adhesive contains 20 to 50 parts by mass of the total of the radiata pine bark powder and wheat flour, relative to 100 parts by mass of the total of the resol type phenolic resin solids, the radiata pine bark powder, and the wheat flour, wherein the mass ratio of the radiata pine bark powder and the wheat flour is 9:1 to 5:5, the proportion of the bark can be increased so as to effectively utilize the bark, and the proportion of the phenolic resin can be reduced to lower the adhesive solids content.

Further, when the mass ratio of the radiata pine bark powder and the wheat flour is 7:3, the adhesive exhibits especially excellent bonding property.

Thus, in the present invention, there can be provided an adhesive using bark, which is advantageous not only in that the proportion of the bark is increased so as to effectively utilize the bark, and the proportion of the phenolic resin is reduced to lower the adhesive solids content, but also in that the composition of the adhesive is simple.

MODE FOR CARRYING OUT THE INVENTION

Hereinbelow, an adhesive using bark according to an embodiment of the present invention will be described. The adhesive using bark according to the present embodiment is an adhesive using bark, which comprises a resol type phenolic resin and a radiata pine bark powder, and has a characteristic feature in the ratio of the resol type phenolic resin solids and radiata pine bark powder incorporated. Further, the adhesive using bark has a characteristic feature in the ratio of the resol type phenolic resin solids, radiata pine bark powder, and wheat flour incorporated.

1. First Embodiment of the Present Invention

The first embodiment of the present invention is an adhesive using bark, which comprises a resol type phenolic resin and a radiata pine bark powder, wherein the adhesive contains 30 to 40 parts by mass of the radiata pine bark powder, relative to 100 parts by mass of the total of the resol type phenolic resin solids and the radiata pine bark powder.

(1) Resol Type Phenolic Resin

The resol type phenolic resin is not particularly limited, but is a resin obtained by a condensation reaction of a phenol with an aldehyde, such as formaldehyde in the presence of a reaction catalyst.

The resol type phenolic resin preferably has a weight average molecular weight of 3,000 to 12,000, more preferably 3,000 to 6,000, further preferably 3,500 to 5,500. The weight average molecular weight is a value measured by gel permeation chromatography (GPC) with respect to the resol type phenolic resin which has been subjected to acetylation.

The solids content of a commercially available resol type phenolic resin is generally 40 to 45%.

(2) Radiata Pine Bark Powder

The radiata pine bark powder is 63 μm or less in particle size. The particle size is a value measured by the method described in the Examples. By using the radiata pine bark powder having such a particle size, the radiata tannin concentration of the adhesive can be increased, making it possible to improve the bonding properties.

The bark of radiata pine contains radiata tannin, and it is presumed that in a plant resource a portion containing tannin at a high concentration is more likely to be ground than the other portion. Therefore, with respect to the radiata pine bark powder used in the present invention, by using the radiata pine bark powder having the above-mentioned particle size, the radiata tannin concentration is considered to be increased, as compared to that of the bark before being ground. Further, the radiata pine bark powder contains components other than radiata tannin, and these components are considered to include a component that contributes to an improvement of the bonding properties.

(3) Other Components

The adhesive according to the first embodiment of the present invention may contain, in addition to the above-mentioned components, if necessary, a known component, such as water, a filler, a colorant, an ultraviolet light absorber, an antioxidant, a curing agent, a tackifier, a plasticizer, a softener, a surfactant, an antistatic agent, a thickening agent, or another adhesive, in such a limit that the effects of the present invention are not sacrificed.

From the viewpoint of suppressing a sick house syndrome, the adhesive according to the first embodiment of the present invention preferably has a lower paraformaldehyde content, and, when the adhesive contains paraformaldehyde, the amount of paraformaldehyde is, relative to 100 parts by mass of the total of the resol type phenolic resin solids and the radiata pine bark powder, more preferably less than 10 parts by mass, further preferably less than 5 parts by mass, and the adhesive most preferably contains substantially no paraformaldehyde.

(4) Adhesive

The adhesive according to the first embodiment of the present invention contains 30 to 40 parts by mass of the radiata pine bark powder, relative to 100 parts by mass of the total of the resol type phenolic resin solids and the radiata pine bark powder. By virtue of having such a composition, the adhesive can achieve satisfactory bonding property while increasing the proportion of the bark so as to effectively utilize the bark and reducing the proportion of the phenolic resin to lower the adhesive solids content.

The adhesive according to the first embodiment of the present invention preferably has a viscosity of 1.5 to 4.0

Pa·s, more preferably 2.0 to 3.0 Pa·s. The viscosity is a value measured by means of a precision rotational viscometer.

Further, the adhesive according to the first embodiment of the present invention preferably has an adhesive solids content of 35 to 45%, more preferably 38 to 42%. The adhesive solids content is a value measured by the method described in the Examples. The adhesive solids content indicates a proportion of the solids contained in the adhesive to the whole of the adhesive, and the solids include the bark powder and the resol type phenolic resin solids.

2. Second Embodiment of the Present Invention

The second embodiment of the present invention is an adhesive using bark, which comprises a resol type phenolic resin and a radiata pine bark powder, wherein the adhesive contains 20 to 50 parts by mass of the radiata pine bark powder and wheat flour, relative to 100 parts by mass of the total of the resol type phenolic resin solids, the radiata pine bark powder, and the wheat flour, and wherein the mass ratio of the radiata pine bark powder and the wheat flour is 9:1 to 5:5.

The resol type phenolic resin, radiata pine bark powder, and other components in the second embodiment of the present invention are similar to those in the first embodiment of the present invention. The paraformaldehyde content of the adhesive is preferably lower, and, when the adhesive contains paraformaldehyde, the amount of paraformaldehyde is, relative to 100 parts by mass of the total of the resol type phenolic resin solids, the radiata pine bark powder, and the wheat flour, more preferably less than 10 parts by mass, further preferably less than 5 parts by mass, and the adhesive most preferably contains substantially no paraformaldehyde.

(1) Wheat Flour

With respect to the wheat flour, any of, for example, strong flour (kyorikiko), all-purpose flour (churikiko), and weak flour (hakurikiko) can be used.

(2) Adhesive

The adhesive according to the second embodiment of the present invention contains 20 to 50 parts by mass of the radiata pine bark powder and wheat flour, relative to 100 parts by mass of the total of the resol type phenolic resin solids, the radiata pine bark powder, and the wheat flour. Further, the mass ratio of the radiata pine bark powder and the wheat flour is 9:1 to 5:5, preferably 8:2 to 6:4, more preferably 7:3 to 6:4, most preferably 7:3. By virtue of having such a composition, the adhesive can achieve satisfactory bonding property while increasing the proportion of the bark so as to effectively utilize the bark and reducing the proportion of the phenolic resin to lower the adhesive solids content. When the composition is in a more preferred range, the composition exhibits especially excellent bonding property.

The adhesive according to the second embodiment of the present invention preferably has a viscosity of 1.5 to 4.0 Pa·s, more preferably 2.0 to 3.0 Pa·s. The viscosity is a value measured by means of a precision rotational viscometer.

Further, the adhesive according to the second embodiment of the present invention preferably has an adhesive solids content of 35 to 49%, more preferably 35 to 45%, further preferably 38 to 42%. The adhesive solids content is a value measured by the method described in the Examples. The adhesive solids content indicates a proportion of the solids contained in the adhesive to the whole of the adhesive, and the solids include the bark powder, the resol type phenolic resin solids, and the wheat flour.

3. Method for Producing the Adhesive According to the First Embodiment and Method for Producing the Adhesive According to the Second Embodiment of the Present Invention A method for producing the adhesive according to the first embodiment of the present invention comprises:
step (1) of grinding radiata pine bark,
step (2) of classifying the ground radiata pine bark into a powder having a particle size of 63 µm or less, and
step (3) of mixing together a resol type phenolic resin and the classified radiata pine bark.

A method for producing the adhesive according to the second embodiment of the present invention comprises:
step (1) of grinding radiata pine bark,
step (2) of classifying the ground radiata pine bark into a powder having a particle size of 63 µm or less, and
step (3) of mixing together a resol type phenolic resin, the classified radiata pine bark, and wheat flour.

In step (1) of the method for producing the adhesive according to the first embodiment and the method for producing the adhesive according to the second embodiment, with respect to the method for grinding the bark, a known grinding method can be employed. For example, the bark is roughly ground, and the ground bark as such, or is adjusted to an appropriate moisture content and then, is finely ground by means of a mill, such as a hammer mill, a Wiley mill, a ball mill, or a roller mill, which is set so as to finely grind the bark into a particle size of preferably 2.5 mm or less, more preferably 2.0 mm or less, further preferably 1.6 mm or less, most preferably 1.0 mm or less, or is fibrillated into a fibrous form. The grinding is not particularly limited, but is preferably conducted in a short time by a method in which the temperature is not increased during the grinding. In step (1), a powder which is finer than the upper limit of the particle size set in the mill is formed, and the formed powder is classified in step (2).

In step (2) of the method for producing the adhesive according to the first embodiment and the method for producing the adhesive according to the second embodiment, with respect to the method for classifying the bark, a known classification method can be employed. For example, there can be mentioned the use of a sieve having a sieve opening corresponding to an intended particle size, a sifting apparatus, such as a rotating drum screen or a sieve shaker, or a dry classification apparatus, such as gravity classification, inertia force classification, or centrifugal classification. By classification, a powder of the bark of 63 µm or less is obtained. It is considered that, by using a powder of 63 µm or less among the powder formed by grinding the bark in step (1), a powder having a high tannin concentration can be used, when compared to a powder obtained from when all the bark is more finely ground in step (1).

In step (3) of the method for producing the adhesive according to the first embodiment and the method for producing the adhesive according to the second embodiment, with respect to the method for mixing together the components, a known mixing method can be employed, and, if necessary, mixing may be conducted while heating or cooling is occurring.

4. Use of the Adhesive

The adhesive of the present invention is advantageously used in the bonding of wood materials. With respect to the wood materials, those having a lower moisture content through those having a higher moisture content can be used.

The present inventors have focused particularly on radiata pine when creating the composition of an adhesive using bark in an attempt to effectively utilize the bark which is a material that is not to be used subsequently. The reason for this is as follows. Studies have been made mainly on acacia bark as bark used in an adhesive using bark. However, wattle tannin contained in acacia bark and radiata tannin contained in radiata pine bark have different chemical properties from each other. The present inventors considered that, when using radiata pine bark in an adhesive using bark, further studies on the ratio of the incorporated radiata pine bark to the adhesive were needed to be made.

Further, during the studies, it has been found that the radiata pine bark markedly changes the viscosity even when only a slight amount of the radiata pine bark is added to a phenolic resin, making it difficult to control the viscosity. In order to solve this problem, the present inventors considered that, by adding wheat flour which causes less change in the viscosity, it becomes possible to easily control the viscosity while keeping the composition of the adhesive simple. Further, they also thought that the addition of wheat flour can achieve a constant wood failure ratio.

In this situation, the present inventors have made studies on "the ratio of the resol type phenolic resin solids and radiata pine bark powder incorporated" and "the ratio of the resol type phenolic resin solids, radiata pine bark powder, and wheat flour incorporated". Hereinbelow, the ratio of the components incorporated in the present embodiment will be described with reference to the following Examples.

EXAMPLES (Method for Test)

(1) The dried radiata pine bark was roughly ground using a garden shredder, and then finely ground using a hammer mill having attached a screen having a pore diameter of 1 mm.

(2) The finely ground bark was classified using a sieve having a sieve opening of 63 μm, and bark having a particle size of 63 μm or less was used in the bonding quality test.

(3) The obtained 63 μm or less bark was mixed with a resol type phenolic resin (weight average molecular weight: about 4,000; measured by GPC with respect to the resin which has been acetylated) and water so that the resultant adhesive had a solids content of 40% and a viscosity of 2.0 to 3.0 Pa·s (23° C.).

(4) As a test specimen, rotary-cut veneer of radiata pine was used.

(5) The adhesive was applied to a specimen at a spread weight of 240 g/m² (single spread), and pressed by cold pressing under 1 MPa for 30 minutes and by hot pressing at 135° C. under 1 MPa for 10 minutes.

(6) Bonding quality test (Examples 1 to 6 and Comparative Example 1) was performed in accordance with the Japanese Agricultural Standard (JAS) for plywood, in which test specimens in the prescribed shape were immersed in boiling water for 72 hours, and then the Shear Strength (hereinafter, referred to as "shear strength (average)") and Average Wood Failure Ratio (hereinafter, referred to as "wood failure (average)") were determined.

The bark powder obtained by the treatments of items (1) and (2) above contains condensed tannin (procyanidin type), which is capable of reacting with formaldehyde to form a polymer, and is present in a larger amount than the bark before being ground. It is redder than the original bark due to the tannin in a larger amount. The method for obtaining a bark powder containing condensed tannin in a larger amount is not limited to the above method, but, by employing the steps for grinding bark and classifying the ground bark, a portion of bark containing tannin in a larger amount can be selectively obtained from the whole bark. In this case, the mill used in the grinding or the pore diameter of the screen can be appropriately selected according to, for example, the tannin content of the obtained bark powder, ease of the preparation of the adhesive, and the yield of the bark powder against the bark. Further, the sieve opening of the sieve used in the classification is 63 μm or less, and the particle size of the bark powder is 63 μm or less.

(Conditions for the Measurement)

(1) Shear Strength

A shear strength was measured in accordance with the Japanese Agricultural Standard (JAS) for plywood.

(2) Average Wood Failure Ratio

The wood failure ratio of a test specimen was visually observed, and was determined. An average of wood failure ratio obtained with respect to a plurality of test specimens was determined as Average Wood Failure Ratio.

(3) Particle Size

The value of the opening of the sieve according to the ISO standards was determined as a particle size.

(4) Adhesive Solids Content Measured Value 1 g of an adhesive was placed in an air-forced drying oven at 105° C. and dried for 24 hours. A value was obtained from: Weight of the adhesive after drying/Weight of the adhesive before drying=Adhesive solids content (%). The preliminary experiment has confirmed that after placed in an air dryer for 24 hours, the adhesive reaches a constant weight.

(5) Viscosity

A viscosity was measured by means of a precision rotational viscometer.

(Indication of the Formulation)

The formulation shown in the following Examples is not indicated in terms of the amount of the aqueous phenolic resin solution but in terms of the amount of the phenolic resin per se (resin solids in the aqueous phenolic resin solution). The phenolic resin is referred to as "PF resin", and the radiata pine bark powder is referred to as "RP bark powder".

(PF Resin+RP Bark Powder)

The results of the test for adhesives using a PF resin and a RP bark powder are shown in Table 1. The test results in Examples 1 and 2 were excellent, despite a low adhesive solids content.

TABLE 1

| | Example 1 | Example 2 |
|---|---|---|
| PF Resin solids content | 60 Parts by mass | 70 Parts by mass |
| RP Bark powder | 40 Parts by mass | 30 Parts by mass |
| Shear strength (Average) | 0.95 MPa | 0.83 MPa |
| Wood failure (Average) | 59% | 28% |
| Judgement of JAS Plywood Bonding quality test results | PASS | PASS |
| Adhesive solids content measured value | 37% | 40% |

(PF Resin+RP Bark Powder+Wheat Flour)

The results of the test for adhesives using a PF resin, a RP bark powder, and wheat flour are shown in Tables 2 to 4. The mass ratio of the RP bark powder and the wheat flour was 7:3. The test results in Examples 3 to 6 shown in Tables 2 and 3 were excellent, despite a low adhesive solids content. The test results in Comparative Example 1 shown in Table 4 were poor. The reason for this is considered to reside in too high a bark proportion.

TABLE 2

|  | Example 3 | Example 4 |
|---|---|---|
| PF Resin solids content | 50 Parts by mass | 60 Parts by mass |
| RP Bark powder + Wheat flour | 50 Parts by mass | 40 Parts by mass |
| Shear strength (Average) | 0.77 MPa | 1.00 MPa |
| Wood failure (Average) | 71% | 68% |
| Judgement of JAS Plywood Bonding quality test results | PASS | PASS |
| Adhesive solids content measured value | 35% | 40% |

TABLE 3

|  | Example 5 | Example 6 |
|---|---|---|
| PF Resin solids content | 70 Parts by mass | 80 Parts by mass |
| RP Bark powder + Wheat flour | 30 Parts by mass | 20 Parts by mass |
| Shear strength (Average) | 0.94 MPa | 1.13 MPa |
| Wood failure (Average) | 68% | 70% |
| Judgement of JAS Plywood Bonding quality test results | PASS | PASS |
| Adhesive solids content measured value | 43% | 45% |

TABLE 4

|  | Comparative Example 1 |
|---|---|
| PF Resin solids content | 40 Parts by mass |
| RP Bark powder + Wheat flour | 60 Parts by mass |
| Shear strength (Average) | 0.56 MPa |
| Wood failure (Average) | 51% |
| Judgement of JAS Plywood Bonding quality test results | FAIL |
| Adhesive solids content measured value | 34% |

(Ratio of the RP Bark Powder and Wheat Flour)

With respect to the adhesives using a PF resin, a RP bark powder, and wheat flour, the results of studies on the ratio of the RP bark powder and the wheat flour (mass ratio) are shown in Tables 5 to 8. The test shown in Tables 5 to 8 is a test to determine the amount of the wheat flour to be incorporated, and is slightly different from the test shown in Tables 1 to 4 for determining the amount of the RP bark powder to be incorporated in respect of the adhesive solids content and the conditions for test. In the test of Tables 1 to 4, a bonding strength test was performed after immersed in boiling water for 72 hours prescribed in the Japanese Agricultural Standard (JAS) for plywood, whereas, in the test of Tables 5 to 8, a bonding strength test was performed without conducting to immerse in boiling water for 72 hours. For this reason, the test results shown in Tables 1 to 4 and the test results shown in Tables 5 to 8 cannot be simply compared with one another. As can be seen from the test results in Examples 7-1 to 10-2, with respect to the specimen in which the ratio of the RP bark powder and the wheat flour (mass ratio) is 9:1 to 5:5, the bonding property was excellent. Particularly, with respect to the specimen in which the ratio of the RP bark powder and the wheat flour (mass ratio) is 7:3, the bonding property was excellent.

TABLE 5

|  | Example 7-1 | Example 7-2 |
|---|---|---|
| PF Resin solids content | 60 Parts by mass | 60 Parts by mass |
| RP Bark powder + Wheat flour | 40 Parts by mass | 40 Parts by mass |
| RP Bark powder:Wheat flour | 9:1 | 9:1 |
| Shear strength (Average) | 1.54 MPa | 1.45 MPa |
| Wood failure (Average) | 70% | 69% |
| Adhesive solids content measured value | 46% | 46% |

TABLE 6

|  | Example 8-1 | Example 8-2 |
|---|---|---|
| PF Resin solids content | 60 Parts by mass | 60 Parts by mass |
| RP Bark powder + Wheat flour | 40 Parts by mass | 40 Parts by mass |
| RP Bark powder:Wheat flour | 8:2 | 8:2 |
| Shear strength (Average) | 1.80 MPa | 1.78 MPa |
| Wood failure (Average) | 74% | 74% |
| Adhesive solids content measured value | 49% | 49% |

TABLE 7

|  | Example 9-1 | Example 9-2 |
|---|---|---|
| PF Resin solids content | 60 Parts by mass | 60 Parts by mass |
| RP Bark powder + Wheat flour | 40 Parts by mass | 40 Parts by mass |
| RP Bark powder:Wheat flour | 7:3 | 7:3 |
| Shear strength (Average) | 2.07 MPa | 1.68 MPa |
| Wood failure (Average) | 83% | 94% |
| Adhesive solids content measured value | 48% | 48% |

TABLE 8

|  | Example 10-1 | Example 10-2 |
|---|---|---|
| PF Resin solids content | 60 Parts by mass | 60 Parts by mass |
| RP Bark powder + Wheat flour | 40 Parts by mass | 40 Parts by mass |
| RP Bark powder:Wheat flour | 5:5 | 5:5 |
| Shear strength (Average) | 1.82 MPa | 1.93 MPa |
| Wood failure (Average) | 83% | 96% |
| Adhesive solids content measured value | 47% | 47% |

From the above-mentioned test results, the following points have been confirmed.

(1) Among the adhesives using a PF resin and a RP bark powder, with respect to the adhesive which contains 30 to 40 parts by mass of the RP bark powder, relative to 100 parts by mass of the total of the PF resin solids and the RP bark powder, the bonding property was excellent (Table 1).

(2) Among the adhesives using a PF resin, a RP bark powder, and wheat flour, with respect to the adhesive which contains 20 to 50 parts by mass of the RP bark powder and the wheat flour, relative to 100 parts by mass of the total of the PF resin solids, the RP bark powder, and the wheat flour, the bonding property was excellent (Tables 2 to 4).

(3) Among the adhesives using a PF resin, a RP bark powder, and wheat flour, with respect to the adhesive in which the ratio of the RP bark powder and the wheat flour (mass ratio) is 9:1 to 5:5, the bonding property was excellent (Tables 5 to 8). Particularly, with respect to the adhesive in which the ratio of the RP bark powder and the wheat flour (mass ratio) is 7:3, the bonding property was excellent.

(4) In the all test results, the adhesive solids content was 50% or less, and it was possible to handle the adhesive with a low viscosity.

The adhesive using bark according to the present embodiment contains a resol type phenolic resin and a radiata pine bark, and therefore bark can be used as such in the adhesive without extracting tannin with a solvent from the bark, so that the adhesive can be provided at a low cost and the bark, which is generated during wood processing and which is a material that is not to be used subsequently for other purpose, can be effectively utilized. Further, there is no need to add an inorganic compound, such as calcium carbonate or sodium hydroxide, and thus the composition of the adhesive is simple. However, the addition of an inorganic compound to the adhesive is not forbidden.

There is no need to incorporate paraformaldehyde into the adhesive, and therefore the problem of a sick house syndrome does not occur. Further the problem of rapid thickening of the resultant adhesive is overcome.

Further, the proportion of the bark can be increased so as to effectively utilize the bark, and the proportion of the phenolic resin can be reduced to lower the adhesive solids content.

Among the disclosed adhesives using bark described in the prior art documents, one in which the proportion of the bark used is relatively high is the adhesive of non-patent document 1 using an acacia bark powder, wherein the proportion of the acacia bark, in terms of the ratio of the acacia bark to the phenolic resin solids, is about 20%. Therefore, the proportion of the bark in the adhesive using bark according to the present embodiment is believed to be very high.

The invention claimed is:

1. An adhesive, comprising a resol type phenolic resin and a radiata pine bark powder having a particle size of 63 μm or less,
   wherein the adhesive contains 30 to 40 parts by mass of the radiata pine bark powder as a component that contributes to an improvement of the bonding properties, relative to 100 parts by mass of the total of the resol type phenolic resin solids and the radiata pine bark powder, and the radiata pine bark powder comprises tannin,
   with the proviso that an inorganic compound, which is not present as a reaction catalyst in the resol type phenolic resin, is substantially not included.

2. The adhesive according to claim 1, wherein the adhesive has a viscosity of 1.5 to 4.0 Pa·s.

3. A method for producing the adhesive according to claim 1, comprising
   grinding radiata pine bark,
   classifying the ground radiata pine bark into a powder having the particle size of 63 μm or less, and
   mixing together a resol type phenolic resin and the classified radiata pine bark.

4. The adhesive according to claim 1, wherein the radiata pine bark powder is prepared by a process that does not include extracting tannin with a solvent from a radiata pine bark.

5. The adhesive according to claim 1, wherein the radiata pine bark powder is prepared by a process that does not include extracting tannin from a radiata pine bark.

6. An adhesive, comprising a resol type phenolic resin and a radiata pine bark powder having a particle size of 63 μm or less,
   wherein the adhesive contains 20 to 50 parts by mass of the radiata pine bark powder as a component that contributes to an improvement of the bonding properties and wheat flour, relative to 100 parts by mass of the total of the resol type phenolic resin solids, the radiata pine bark powder, and the wheat flour, and wherein the mass ratio of the radiata pine bark powder and the wheat flour is 9:1 to 5:5 and the adhesive has a viscosity of 1.5 to 4.0 Pa·s,
   with the proviso that an inorganic compound, which is not present as a reaction catalyst in the resol type phenolic resin, is substantially not included.

7. The adhesive according to claim 6, wherein the mass ratio of the radiata pine bark powder and the wheat flour is 7:3.

8. A method for producing the adhesive according to claim 7, comprising
   grinding radiata pine bark,
   classifying the ground radiata pine bark into a powder having the particle size of 63 μm or less, and
   mixing together a resol type phenolic resin, the classified radiata pine bark, and wheat flour.

9. A method for producing the adhesive according to claim 6, comprising
   grinding radiata pine bark,
   classifying the ground radiata pine bark into a powder having the particle size of 63 μm or less, and
   mixing together a resol type phenolic resin, the classified radiata pine bark, and wheat flour.

10. An adhesive, comprising a resol type phenolic resin and a radiata pine bark powder having a particle size of 63 μm or less,
    wherein the adhesive contains 30 to 40 parts by mass of the radiata pine bark powder as a component that contributes to an improvement of the bonding properties, relative to 100 parts by mass of the total of the resol type phenolic resin solids and the radiata pine bark powder, and the radiata pine bark powder comprises tannin,
    with the proviso that an inorganic compound, which is not present as a reaction catalyst in the resol type phenolic resin, is excluded.

11. An adhesive, comprising a resol type phenolic resin and a radiata pine bark powder having a particle size of 63 μm or less,
    wherein the adhesive contains 20 to 50 parts by mass of the radiata pine bark powder as a component that contributes to an improvement of the bonding properties and wheat flour, relative to 100 parts by mass of the total of the resol type phenolic resin solids, the radiata pine bark powder, and the wheat flour, and wherein the mass ratio of the radiata pine bark powder and the wheat flour is 9:1 to 5:5 and the adhesive has a viscosity of 1.5 to 4.0 Pa·s,
    with the proviso that an inorganic compound, which is not present as a reaction catalyst in the resol type phenolic resin, is excluded.

* * * * *